United States Patent [19]

Blumenthal et al.

[11] Patent Number: 4,689,161

[45] Date of Patent: Aug. 25, 1987

[54] VISCOSIFIER, ITS USES, AND ITS MANUFACTURE

[75] Inventors: Jack L. Blumenthal, Los Angeles; Edward F. Brooks, Hermosa Beach; Quentin H. McKenna, Lomita, all of Calif.

[73] Assignee: TRW Inc., Redondo Beach, Calif.

[21] Appl. No.: 738,203

[22] Filed: May 24, 1985

[51] Int. Cl.[4] .......... C10M 125/02

[52] U.S. Cl. .......... 252/29; 252/28; 252/49.3; 252/25; 252/13

[58] Field of Search .......... 252/29; 423/652

[56] References Cited

U.S. PATENT DOCUMENTS

| | | | |
|---|---|---|---|
| 1,964,744 | 7/1934 | Odell | 423/459 |
| 2,008,270 | 7/1935 | Willekens | 423/459 |
| 2,704,293 | 3/1955 | Kratzer | 260/450 |
| 3,031,287 | 4/1962 | Benson et al. | 48/197 |
| 3,816,609 | 6/1974 | Hamner | 423/652 |
| 3,861,885 | 6/1975 | Schora | 423/459 |
| 4,201,777 | 5/1980 | Inoue | 252/29 |
| 4,366,085 | 12/1982 | Thegami et al. | 423/210 S |
| 4,545,913 | 10/1985 | Mahrus | 252/12.6 |

FOREIGN PATENT DOCUMENTS

| | | |
|---|---|---|
| 308351 | 3/1930 | United Kingdom . |
| 1287702 | 9/1972 | United Kingdom . |
| 2002726B | 2/1979 | United Kingdom . |
| 2002726 | 8/1982 | United Kingdom . |

OTHER PUBLICATIONS

Kirk and Othmer, Encyclopedia of Chemical Technology, John Wiley and Sons, vol. 14, pp. 477–526, vol. 17 pp. 143–167.

Walker et al., "Carbon Formation . . . ", 5-*Phys. Chem* 63., pp. 133–149, 1959.

Renshaw et al., "Disproportionation of CO", J-Catalysis, pp. 394–410, 22, 1971.

Baker et al., "Formation of Filamentous Carbon", edited by Walker from textbook Chemistry and Physics of Carbon, 14:83–146, 1978.

Renshaw et al., "J. of Catalysis", 18:164–83, 1970.

Coen, "Order to Survey . . . ", Dec., 1961, pp. 1–17.

Boehm, "Carbon and . . . ", Carbon, Pergamon Press, pp. 583–590, 1973.

Donald H. Jack, "An Annotated Bibliography . . . ", Mellon Institute, 1956.

Hofer et al., "Structure of the Carbon . . . ", J. Phys. Chem., 59:1153–6, 1955.

MacIver et al., J. Phys. Chem., 59:1109–10, 1955.

Renshaw et al., J. Catalysis, 18:164–83, 1970.

Ruston et al., "The Solid . . . ", *Carbon*, 7:47–57, Pergamon Press, 1969.

*Primary Examiner*—Jacqueline V. Howard

*Attorney, Agent, or Firm*—Benjamin DeWitt; Jeffrey G. Sheldon

[57] ABSTRACT

A composition of matter suitable for increasing the viscosity of liquids comprises tendrillar carbonaceous material (TCM) having a ultra low bulk density of less than about 0.1 g/cm$^3$ and comprises intertwined tendrils having a diameter (number average) of from about 0.05 to about 0.2 micron and a length (number average) to diameter (number average) ratio greater than about 10, the tendrils comprising carbon fibers and an iron metal component dispersed throughout the carbon fibers as nodules that are intimately associated with and at least partially bonded to the carbon fibers, the tendrillar carbonaceous material comprising from about 0.1 to about 5% by weight iron. The TCM can be used as a viscosifier and for suspending solids in such applications as drilling muds, lubricating oils and greases. The TCM can be prepared by disproportionating carbon monoxide in the presence of iron contained in a blend of (1) previously formed TCM and (2) iron containing particles.

83 Claims, 9 Drawing Figures

FIG. 1.

TRANSMISSION ELECTRON MICROGRAPH OF TCM, 32,000 X

FIG_2

SCANNING ELECTRON MICROSCOPE PHOTO OF TCM, 20,000X

SURFACE AREA VS BULK DENSITY FOR FIBROUS CARBONS CONTAINING 2-5% IRON

VISCOSITY OF 5% CARBON LOADED MINERAL OIL AS A FUNCTION OF SURFACE AREA OF CARBON

VISCOSITY VS SHEAR RATES FOR 5% TCM IN MINERAL OIL AND FOR PURE MINERAL OIL AT SEVERAL TEMPERATURES

VISCOSITY AS A FUNCTION OF CARBON LOADING IN MINERAL OIL ($1\ sec^{-1}$ SHEAR RATE)

VISCOSITY VS SHEAR RATE FOR MINERAL OIL LOADED WITH CARBONS OF DIFFERENT BULK DENSITY (5% CARBON LOADING)

VISCOSIFIER, ITS USES, AND ITS MANUFACTURE

CROSS-REFERENCES

This application is related to application Ser. No. 620,996 filed on June 15, 1984 by Edward F. Brooks, entitled "Method for Making Carbonaceous Materials", which is a continuation-in-part of application Ser. No. 339,778 filed on Jan. 15, 1980 by Edward F. Brooks, now abandoned, which is a continuation of application Ser. No. 188,201 filed on Sept. 18, 1980 by Edward F. Brooks, now abandoned. These three patent applications are incorporated herein by this reference.

BACKGROUND

The present invention relates to a viscosifier, its uses, and methods for its manufacture.

Viscosifiers for thickening or gelling organic and aqueous liquids have many applications. These include lubricating oils, greases, and drilling fluids. Exemplary of viscosifiers used are: (1) linear polymers for improving the viscosity-index of lubricating oils; (2) fatty acid soaps of lithium, calcium, sodium, aluminum, and barium, and clays which are used in greases; and (3) clays such as bentonite in drilling fluids. In drilling fluids clays act as viscosifiers, and also act to suspend weighting materials such as barite in the fluid.

Many viscosifiers have significant limitations, including inadequate thermal stability, inability to be used both with aqueous and hydrocarbon based fluids, limited use with acidic and/or basic liquids, inadequate shear thinning properties, incompatibility with electrolytes, and inability to adequately suspend weighting materials such as barites.

Accordingly, for many applications there is a need for an improved viscosifier.

SUMMARY

The present invention is directed to a viscosifier that satisfies this need. According to the present invention a composition of matter suitable for increasing the viscosity of liquids comprises ultra low bulk density tendrillar carbonaceous material-having a bulk density of less than 0.1 g/cm$^3$ and generally a surface area of less than about 190 m$^2$/g and comprising intertwined tendrils having a diameter (number average) of from about 0.05 to about 0.2 micron, and a length (number average) to diameter (number average) ratio greater than about 10. As used herein, by "TCM" there is meant the novel low bulk density material of the present invention. All bulk densities of TCM presented herein refer to the bulk density of TCM "as prepared".

Preferably the TCM has a bulk density of less than about 0.05 g/cm$^3$ and the tendrils comprise carbon fibers with an iron metal component dispersed throughout the carbon fibers as nodules that are intimately associated with and at least partially bonded to the carbon fibers. The TCM can comprise from about 0.1 to about 5% by weight iron, preferably less than about 4% by weight iron, about 93.5 to about 99.9% by weight carbon, and up to about 1.5% by weight hydrogen. Generally the TCM has a bulk density of at least about 0.02 g/cm$^3$. Preferably the TCM has a surface area of less than about 160 m$^2$/g and generally greater than about 30 m$^2$/g. The tendrils preferably have a diameter (number average) of from about 0.08 to about 0.14 micron.

TCM can be added to a liquid to increase the viscosity of the liquid. Typically sufficient TCM is added to liquid, in an amount of at least 0.1% by weight, that the viscosity of the liquid at a shear rate of 1 sec$^{-1}$ is at least 10 cp and at least a factor of 10 greater than the viscosity of the liquid without the TCM present. TCM can also be added to a liquid to suspend dense solids in the liquid. By the term "dense solid" there is meant a solid having a density greater than the density of the liquid in which the solid is dispersed.

TCM is effective as a viscosifier for both aqueous and hydrocarbon liquids, and including emulsions such as water-in-oil emulsions. It is effective as a viscosifier for acidic solutions such as solutions having a pH of less than 4, and for basic solutions, such as solutions having a pH of greater than 9.

TCM can be used in drilling fluids. A drilling fluid can comprise a liquid having dispersed therein (i) sufficient weighting agent such as barite that the drilling fluid has a density of at least 1.1 g/cm$^3$ and (ii) sufficient TCM in an amount of at least 0.1% by weight based on the weight of the drilling fluid that the drilling fluid has a viscosity of at least 10 cp at a shear rate of 1000 sec$^{-1}$. The liquid in the drilling fluid can be water, an oil-in-water emulsion, or a hydrocarbon. The tendrillar carbonaceous material not only increases the viscosity of the drilling fluid but also helps suspend the weighting agent. The drilling fluid can include components typically found in drilling fluids such as (1) other viscosity increasing agents such as clay, (2) viscosity thinning agents, (3) alkalinity control agents to maintain the pH of the drilling fluid greater than 7.0, (4) surfactants, and/or (5) flocculents.

A grease can comprise a lubricating oil having dispersed therein sufficient TCM, in an amount of at least 0.1% by weight of the grease, that the grease has an apparent viscosity of at least 4 Pa.S at a shear rate of 100 sec$^{-1}$. A grease generally contains from about 5 to about 15% by weight TCM. The grease can also contain, in addition to the TCM, conventional gelling agents such as those selected from the group consisting of fatty-acid soaps of lithium, calcium, sodium, aluminum, and barium.

A method for increasing the viscosity of a liquid according to the present invention merely requires dispersing TCM in the liquid, such as by adding TCM to the liquid and then mixing. Generally no wetting agent is required.

A method for suspending a dense solid in a liquid according to the present invention merely requires dispersing the TCM in the liquid, before, during, or after adding the dense solid.

This invention includes two novel methods for preparing TCM. Both methods require an initial feed of TCM which can be prepared by a technique described below. One of the novel methods uses a fixed bed reactor and the other method uses a fluidized bed reactor. In the fixed bed method, previously formed feed TCM is blended with a finely divided particulate comprising iron, where the blend contains at least about 5% by weight iron, preferably less than about 60% by weight iron. A feed gas containing carbon monoxide is introduced into a reaction zone having a fixed bed of the blend. The iron of the particulate catalyzes the disproportionation of at least a portion of the carbon monoxide to form additional TCM. The temperature in the reaction zone is maintained at from about 400° to about 500° C. The additional TCM is recovered from the reaction zone.

Preferably the finely divided particulate has a number average diameter of less than 10 microns. The iron in the particulate can be selected from the group consisting of oxides of iron, elemental iron, and combinations thereof.

In the fluidized bed method, feed TCM is also blended with the finely divided particulate comprising iron compounds, the blend containing from about 5 to about 40% by weight iron, preferably less than about 20% by weight iron. Feed gas containing carbon monoxide is introduced into a reaction zone having a bed containing the blend to form a fluidized bed. Preferably the feed gas is introduced at a superficial velocity of from about 3 to about 20 cm/sec, and more preferably from about 6 to about 15 cm/sec. In the fluidized bed the iron of the particulate catalyzes the disproportionation of at least a portion of the carbon monoxide to form additional TCM. The temperature in the reaction zone is maintained from about 400° to about 500° C., and additional TCM formed in the reaction zone is recovered therefrom. Preferably the temperature in the fixed bed reaction zone is from about 430° to about 460° C. and in the fluidized bed reaction zone is from about 450° to about 490° C.

DRAWINGS

These and other features, aspects, and advantages of the present invention will become better understood with reference to the following description, appended claims, and accompanying drawings where:

FIG. 1 is a transmission electron micrograph at 32,000 magnification of TCM having a bulk density of about 0.03 g/cm$^3$, a surface area of about 130 m$^2$/g, and an iron content of about 3% by weight;

FIG. 2 is a scanning electron microscope photograph of TCM produced with iron oxide powdered catalyst at a magnification of 20,000, the TCM having a bulk density of about 0.027 g/cm$^3$, a surface area of about 122 m$^2$/g, and an iron content of about 4.2% by weight;

Figure 5:
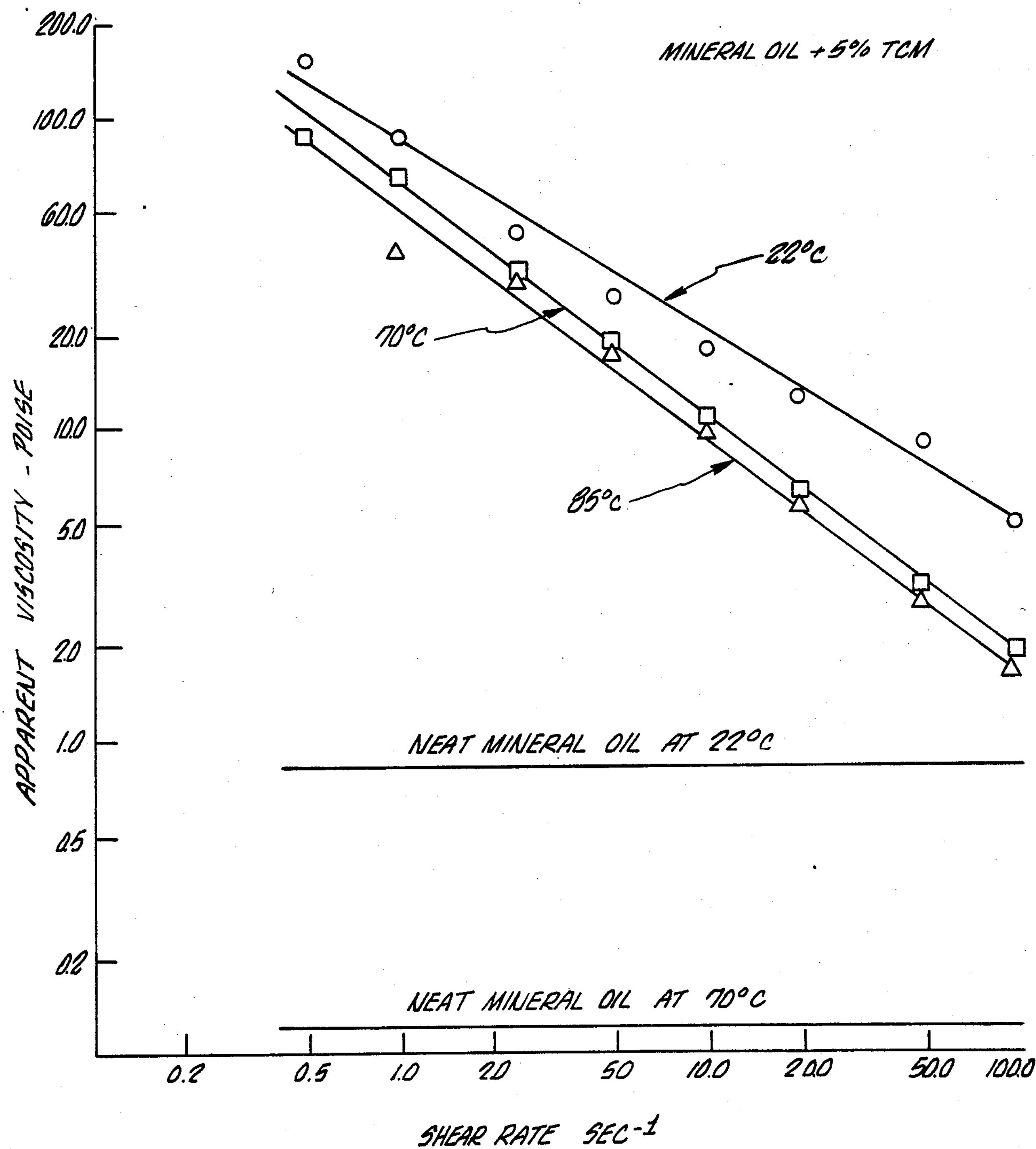
Figure 6:
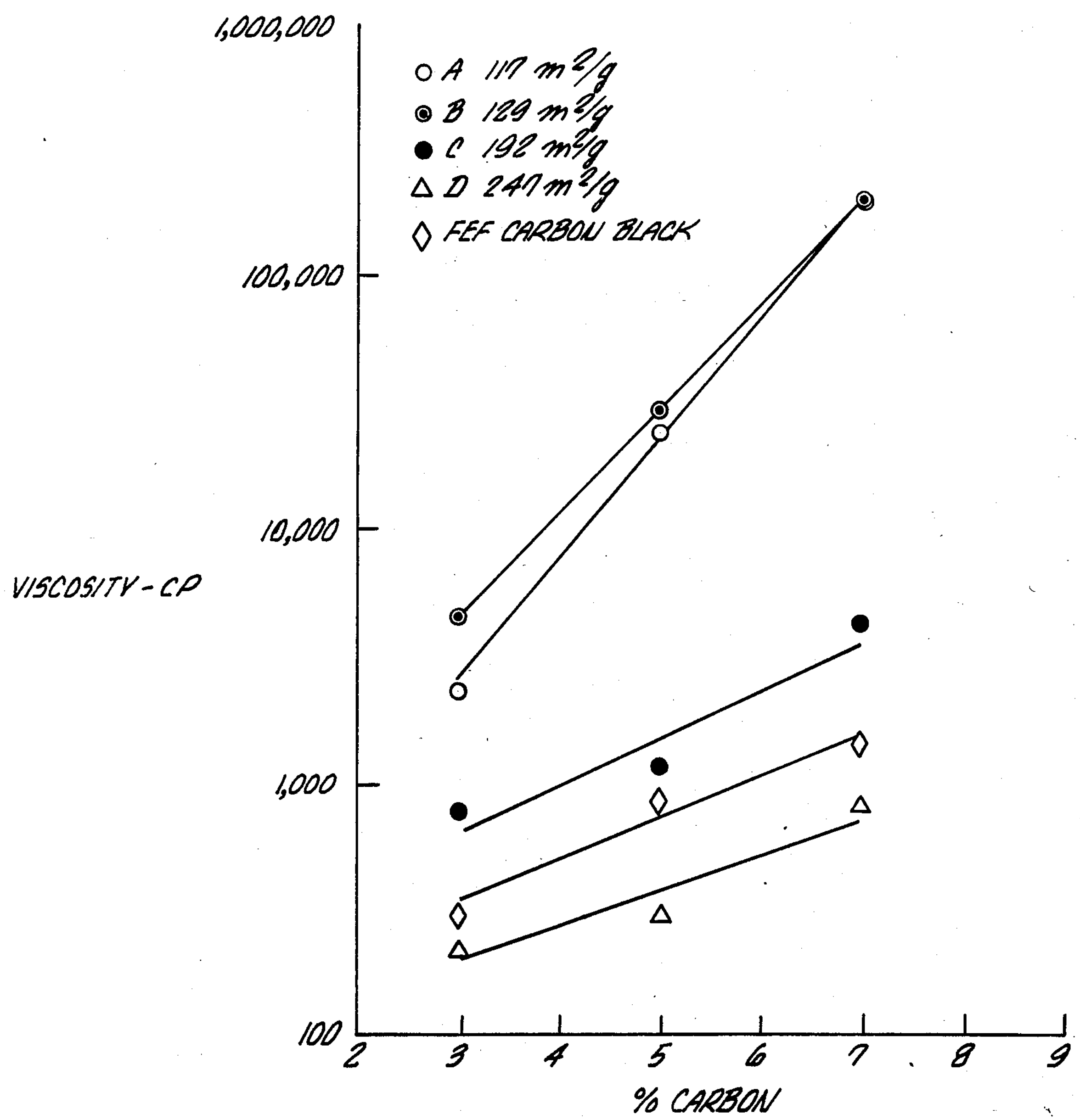
Figure 8:
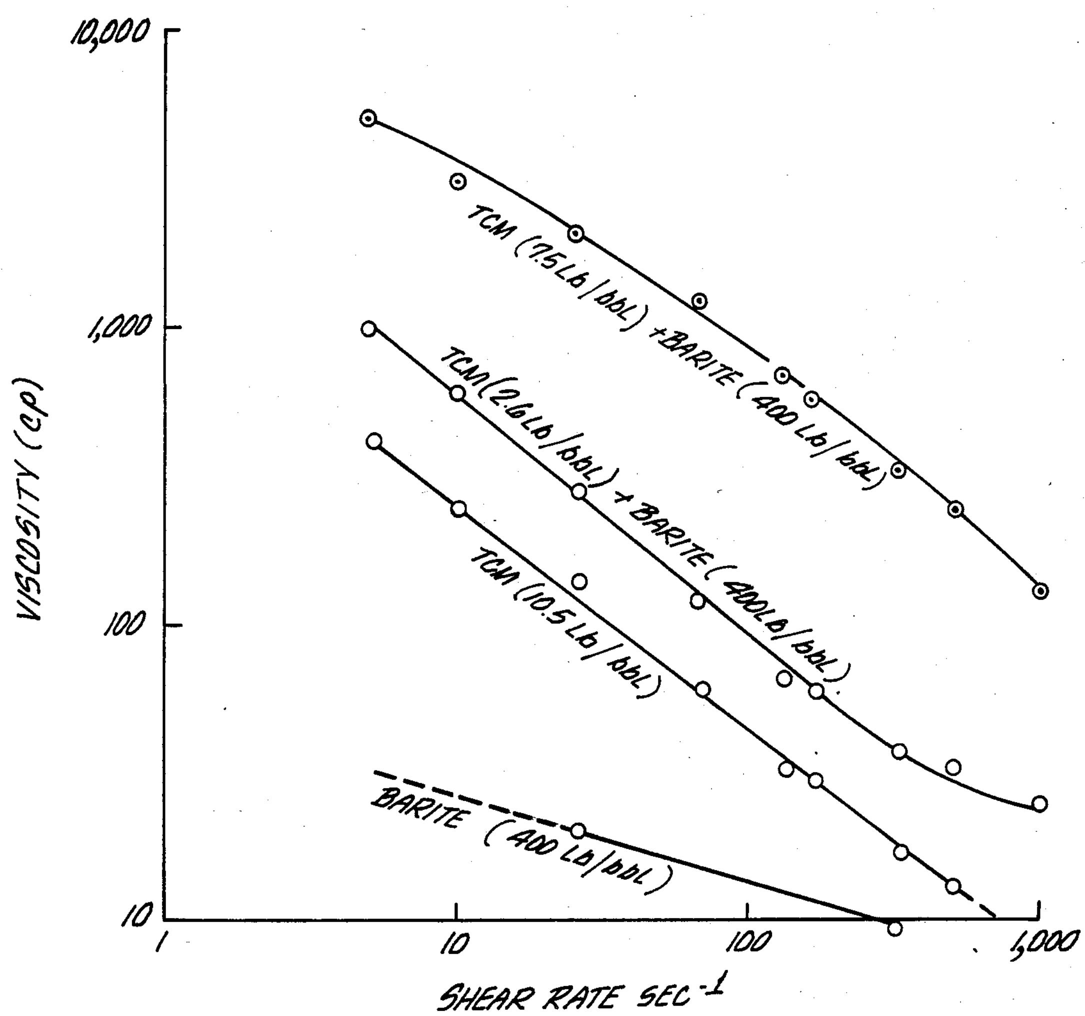
Figure 9:
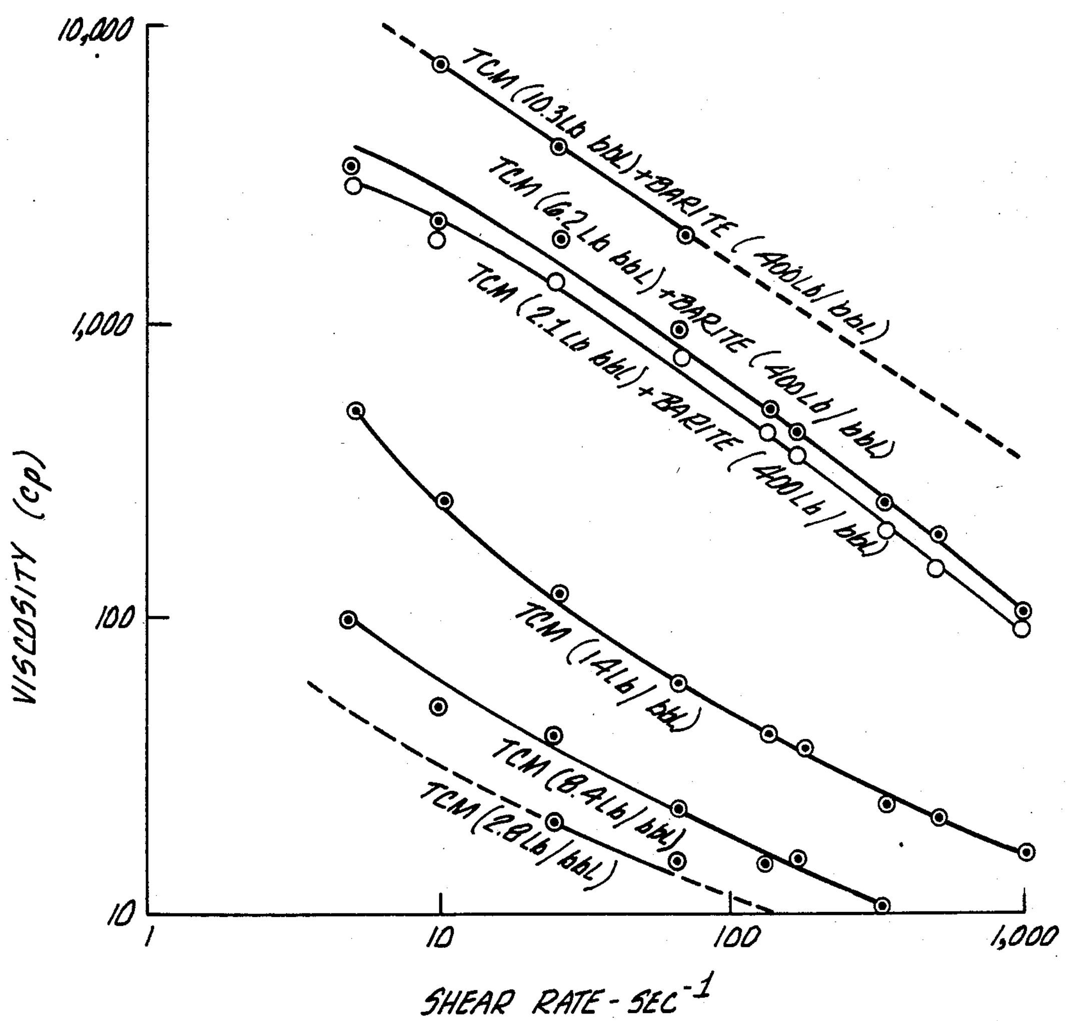

FIG. 5 presents plots of viscosity versus shear rate for mineral oil containing 5% by weight TCM and for pure mineral oil at several temperatures;

FIG. 6 presents plots of viscosity as a function of carbon loading for mineral oil containing various forms of carbon including TCM;

FIG. 7 presents plots of viscosity versus shear rate for mineral oil loaded with various forms of carbon including TCM;

FIG. 8 presents plots of viscosity versus shear rate for a water based mud, aged at 300° F., containing barite and/or TCM; and FIG. 9 presents plots of viscosity versus shear rate for an oil based mud containing (a) TCM or (b) TCM and barite.

DESCRIPTION

A. Physical Properties and Composition of TCM

It has been discovered that certain carbon containing materials of exceptionally low bulk density are remarkably effective viscosifiers. These carbon containing materials are produced by novel processes and must have specific physical properties to be effective. This material is tendrillar carbonaceous material, i.e., TCM. It comprises intertwined tendrils comprising carbon.

For the TCM to be an effective viscosifier, it must have a bulk density of less than about 0.1 g/cm$^3$, and preferably a bulk density of less than about 0.05 g/cm$^3$. Generally TCM has a bulk density of at least about 0.02 g/cm$^3$. The importance of the TCM having a bulk density of less than about 0.1 g/cm$^3$ is demonstrated by Example 11 below.

By "bulk density" of TCM there is meant the bulk density of the "as prepared" material, prior to any further processing. It is possible to change the density of "as prepared" TCM by processes such as compacting TCM or by dispersing TCM in a liquid and then drying the TCM.

All bulk density values presented herein are values determined by the following technique. A tared 25 ml graduated cylinder is filled with a sample of the TCM. The bottom of the cylinder is gently tapped on a flat surface while the cylinder is slowly rotated. This procedure is continued until no further change in sample volume occurs. The cylinder and sample are then weighed and the sample bulk density is calculated as the weight of the sample divided by the final volume that the sample occupied in the graduated cylinder. For a given sample of material, the values obtained are generally reproducible within ±5%.

In preferred methods for producing TCM as described in detail below, the TCM is formed by the disproportionation of a feed gas such as a gas containing carbon monoxide over an iron containing catalyst. The TCM produced by this technique has tendrils comprising carbon fibers and an iron metal component dispersed throughout the carbon fibers as nodules that are intimately associated with and at least partially bonded to the carbon fibers.

TCM contains no more than about 5% by weight iron, and preferably less than about 4% by weight iron. Higher iron contents result in shorter tendrils which results in significantly reduced viscosifying effects in liquids as demonstrated by Example 12 below. Preferably the TCM contains at least 1% by weight iron because the rate of production of TCM at lower iron contents becomes economically unattractive. The iron in TCM generally is not elemental iron, and usually is in the form of carbides and/or oxides of iron. At least a portion of the iron of the "as produced" TCM can be removed therefrom such as by leaching with an acid. Therefore the "as used" TCM can have an iron content of less than 0.1% by weight.

Figure 2:
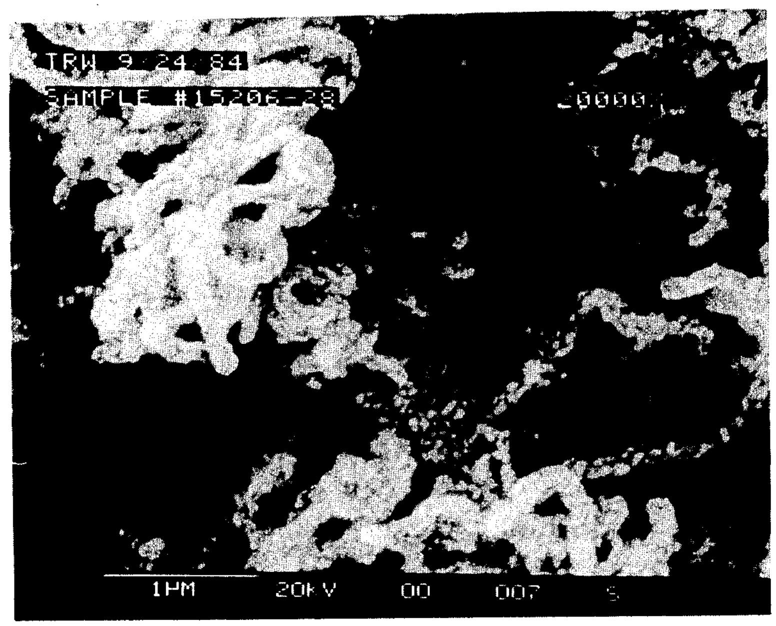
Figure 1:
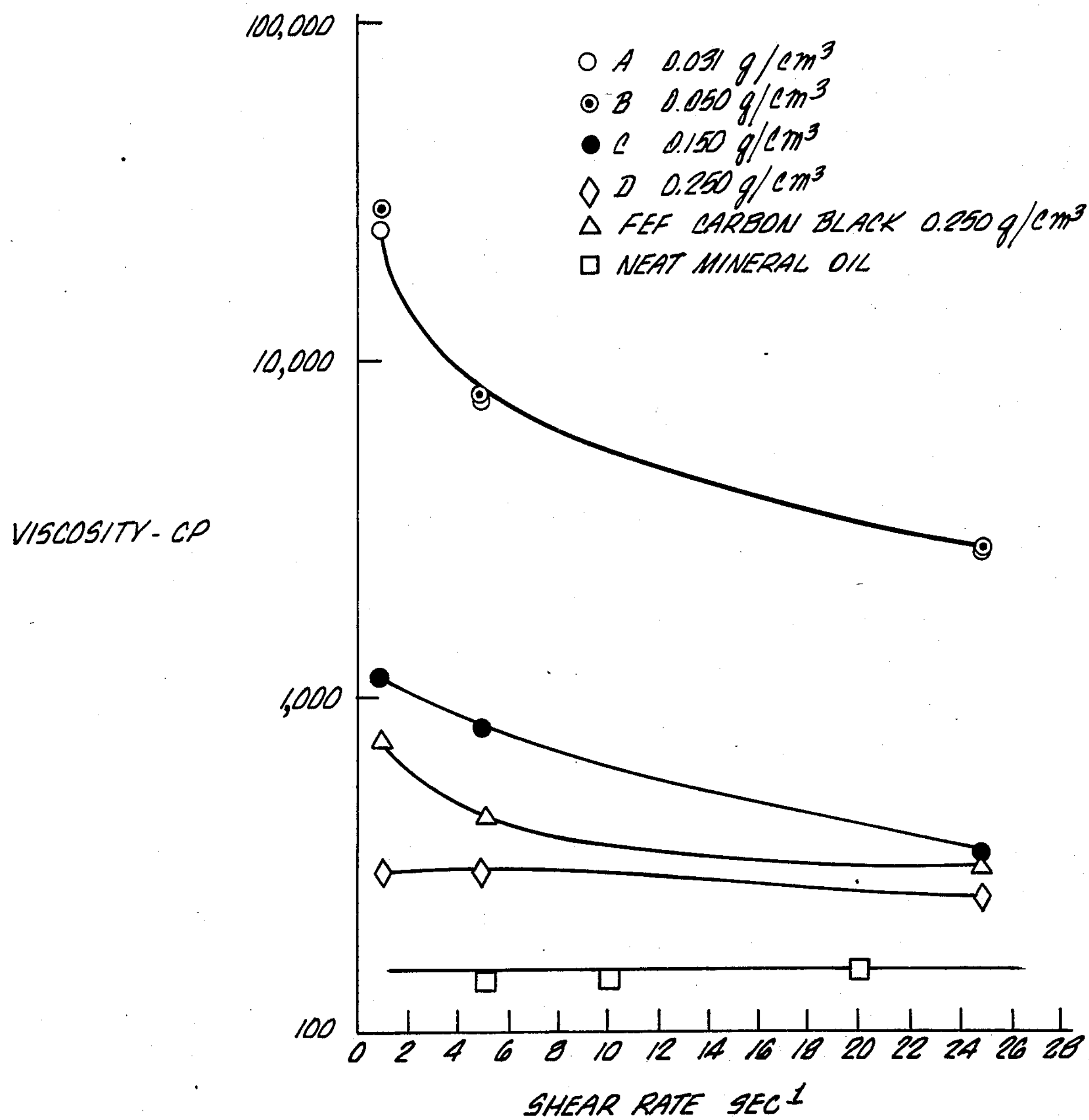

The TCM can also contain hydrogen such as when the feed gas used to form the TCM contains hydrogen. Typically the TCM comprises from about 1 to about 5% by weight iron, about 93.5 to about 99% by weight carbon, and up to about 1.5% by weight hydrogen. The iron content of TCM can be determined by burning off the hydrogen and carbon and assuming the remaining ash consists of $Fe_2O_3$. FIGS. 1 and 2 show a transmission electron micrograph and a scanning electron microscope photograph, respectively, of TCM. From such micrographs and photographs it has been determined that TCM comprises intertwined tendrils having a diameter (number average) of from about 0.05 to about 0.2 micron and a length (number average) to diameter (number average) ratio greater than about 10.

Figure 3:
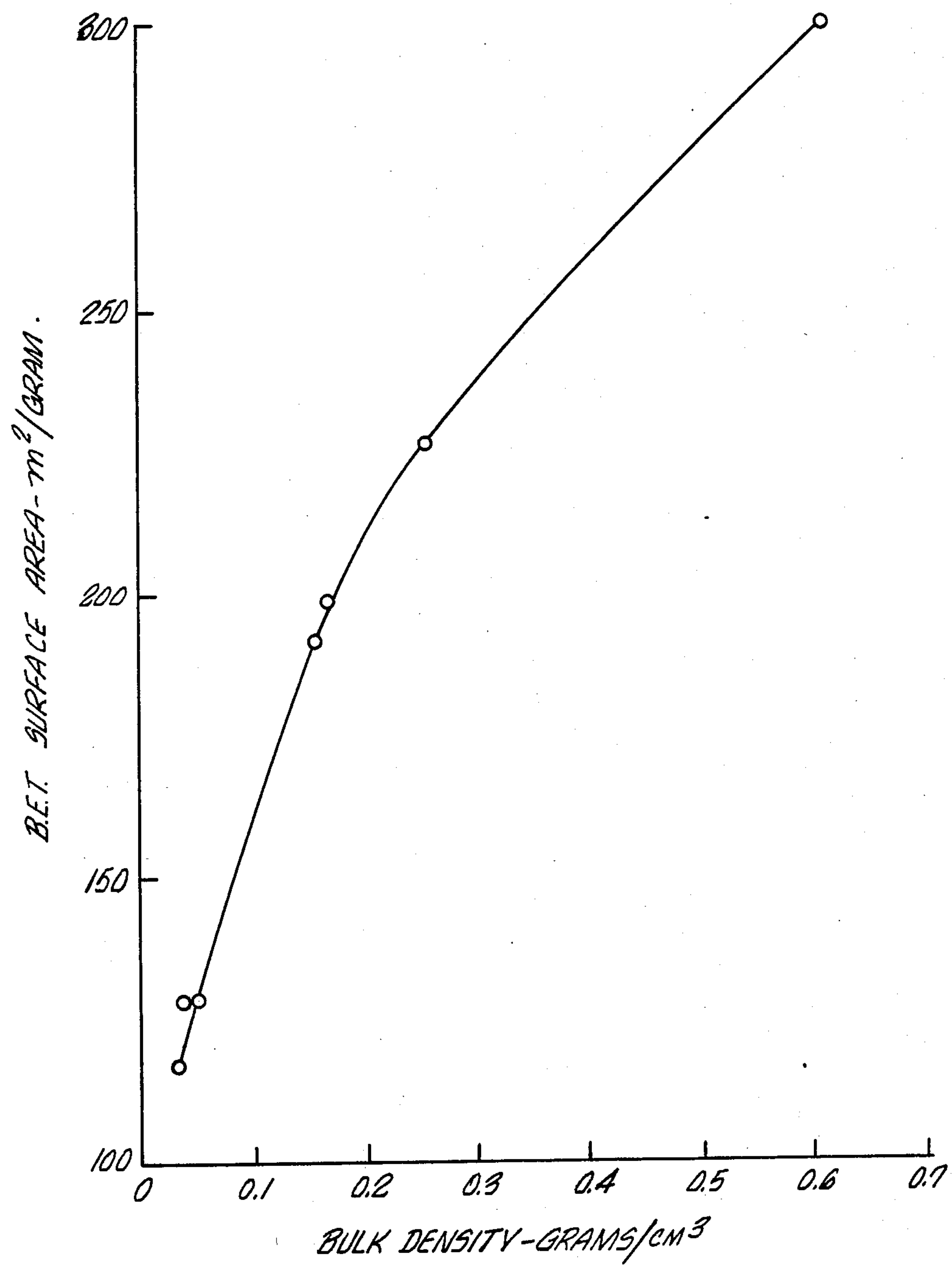
FIG. 3 is a plot of surface area versus bulk density for typical TCM.

Surprisingly, as shown in FIG. 3, for one form of TCM, there is a positive correlation between the surface area of TCM and its bulk density, i.e. the surface area of TCM increases as its bulk density increases. As used herein, all the surface area values of TCM presented are obtained by the BET method of Brunnauer, Emmett, and Teller, J. Am. Chem. Soc., 60, 309 (1938). The reproducibility of the specific surface area measurement on different samples of the same batch of "as prepared" TCM using this method is typically about $\pm 7\%$, while the reproducibility of the measurement on the same sample is typically $\pm 2$ to 3%. Preferably the surface area of TCM is less than 190 $m^2/g$, and more preferably less than about 160 $m^2/g$ for the TCM to have the ultra low bulk density required for TCM to be an effective viscosifier. Typically TCM has a surface area greater than about 30 $m^2/g$, and preferably from about 50 to about 160 $m^2/g$.

The novel material of the present invention has now been characterized in five ways:

1. Its chemical composition, and particularly the amount of iron present in the "as formed" material;
2. Bulk density;
3. Surface area;
4. Tendril diameter; and
5. Tendril length to diameter ratio.

A theory for the fact that carbonaceous materials having a bulk density of greater than about 0.1 $g/cm^3$ and a surface area greater than about 190 $m^2/g$ are ineffective as viscosifiers is available. Not to be bound by this theory, it is believed that in a high bulk density material the tendrils are knit together and there is material of varying density interspersed between the tendrils. This is shown by transmission electron microscope photographs. It is believed that in the high density material with high surface area the tendrils are so tightly bound together by the inter-knitting that the tendrils cannot interlock throughout a liquid and hence do not produce gelling. In short, the tightly bound fibrous material acts as individual particles that have little interaction with each other and hence do not set up a fiber matrix throughout the liquid.

Contrarily, with the low bulk density, lower surface area material the tendrils interact with each other to produce the matrix effect needed for increasing viscosity of a liquid and for gelling a liquid.

B. Methods for Producing TCM

Three methods will be described for producing TCM: (1) a fixed bed method for producing small quantities of starter material; (2) a fixed bed method for producing large quantities of TCM; and (3) a fluidized bed method for producing large quantities of TCM. All three methods have certain features in common, namely:

1. The TCM is formed by disproportionation of carbon monoxide in the presence of an iron containing particulate;

2. The particulate is finely divided, preferably having a number average diameter of less than about 10 microns, and most preferably less than about 2 microns;

3. The temperature at which disproportionation occurs must be controlled within a narrow temperature range, about 400° to about 500° C., preferably from about 430° to about 460° C. for a fixed bed process, and preferably from about 450° to about 490° C. for a fluidized bed process; and 4. Sufficient room in the bed is provided that the particulate can be dilutely dispersed and the carbon tendrils can grow in an unrestrained fashion.

It has been found that processes not satisfying these requirements fail to produce the desired ultra low bulk density material. For example, at temperatures greater than about 500° C., the material formed has a higher bulk density and larger fiber diameters than desired and is unsatisfactory as a viscosifier. This is demonstrated by Examples 4, 15 and 16 below. At temperatures below about 400° C. there is a potential for formation of Fischer-Tropsch waxes.

If the reactor bed is restrained, the product formed has a higher bulk density than desired. It is necessary to have the growing fiber mass expand outwardly rather than grow inwardly or densify. This is demonstrated by Example 5 below. Similarly if the iron containing particles are too close together in the bed a product with a bulk density higher than about 0.1 $g/cm^3$ is formed. This is demonstrated by Example 1 below.

The particulate containing iron can comprise only an iron compound. For example, the particulate can be iron oxide powder ($Fe_2O_3$) with a number average particle size of 0.5 micron. Other iron oxides such as $Fe_3O_4$ or finely divided iron powders such as carbonyl iron or iron metal can be used. All particles sizes for the particulate presented herein are number average.

It is believed that other forms of iron can be used, including alloys of iron. However, an attempt to make TCM according to the present invention with stainless steel as the disproportionation catalyst was unsuccessful. The iron containing catalyst can be promoted with disproportionation promoters, such as alkali metal hydroxides, including sodium hydroxide and potassium hydroxide. It is believed that "ferrous metals" other than iron can be used. By the term "ferrous metal" there is meant metals of Group VIII of the Periodic Table of the Elements, including iron, cobalt, nickel, and combinations, carbides, oxides, and alloys thereof.

The feed gas used is a gas mixture whose reactive components are carbon monoxide and hydrogen. When made conventionally, as in coal gasification, such gas mixtures generally also contain non-reactive components such as nitrogen. Most commercially available gas feed streams containing carbon monoxide also contain relatively large amounts of hydrogen. Production of TCM is generally effected with feed gas streams having carbon monoxide to hydrogen molar ratios of at least about 1:1, preferably at least about 2:1, and generally up to about 10:1.

In the method for manufacturing small quantities of TCM, the particulate containing iron is spread in a thin layer on a substrate such as a quartz plate that is then placed in a reactor which can be a horizontal tubular reactor. Preferably the layer is very thin. For example, for a particulate consisting of iron oxide powder, $Fe_2O_3$, having a particle size of about 0.5 micron, preferably the thickness of the particulate layer is less than about 0.01 gram of iron per square centimeter. The importance of using a thin layer is demonstrated by Example 1 below.

The feed gas is passed over the iron powder at a temperature of from about 400° to about 500° C. and the iron of the particulate catalyzes the disproportionation of at least a portion of the carbon monoxide to form TCM.

Carbon deposition rates for a feed gas consisting of 52% carbon monoxide and 48% hydrogen are typically from about 1 to about 2 pounds of carbon per hour per pound of iron. This rate is increased by about 30% if the iron oxide powder is promoted with 0.75 weight percent sodium hydroxide, based on the weight of the iron oxide.

Since sulfur compounds can poison the iron containing catalyst, they preferably are removed from the feed gas. Good results have been obtained with iron oxide powder containing less than 0.1% by weight sulfur.

Although this first method is effective for producing ultra low bulk density TCM, it is unsatisfactory for commercial production. The second method, which also uses a fixed bed, is better for producing large quantities of TCM. In this method the iron catalyst is made sufficiently dilute by blending it into already prepared TCM. The TCM used can be that formed by the first method. The intertwined carbon tendrils of the TCM entrap and disperse the catalyst particles and keep individual particles separated into a three dimensional matrix. Using the combined TCM/particulate starting mass, addition of carbon occurs by expanding the volume of the mass rather than by increasing the density of the mass. It is possible to add at least 10 times or more to the amount of carbon in the original TCM mixture.

A blend of TCM and the particulate containing iron can be obtained by dry blending the two materials in a vee type blender. Alternatively, blending can be effected by mixing the two powders in an organic liquid such as toluene, filtering the mixed solid mass, and drying.

The ratio of the mass of iron to the mass of TCM in the blend is at least about 1:20 to obtain effective rates of production and can be up to about 4:1.

In the third method, rather than using the blend in a fixed bed, the blend is used in a fluidized bed. Techniques for manufacturing fibrous carbonaceous material in a fluidized bed are described in aforementioned U.S. patent application Ser. No. 620,996 filed June 15, 1984 by Edward F. Brooks. A difference between the process of the present invention and the process described in the '996 application is that in the process of the present invention no abradant is used in the fluidized bed.

In the fluidized bed method the same feed gas can be used as is used in the fixed bed method. However, the blend of TCM and particulate containing iron contains no more than about 40% by weight iron, and preferably less than about 20% by weight iron, to avoid forming a carbonaceous material having a bulk density too high to be effective as a viscosifier.

The blend of the TCM and particulate containing iron are fluidized by the feed gas, with the feed gas being introduced at a superficial velocity sufficient to fluidize the bed. The superficial velocity of the feed gas is from about 3 to about 20 cm/sec, and preferably from about 6 to about 15 cm/sec.

The reactor operating pressure can be from about 1 to about 10 atmospheres. The contact time of carbon monoxide with particulate containing iron is from about 10 to about 100 seconds, more preferably from about 30 to about 80 seconds.

For the fluidized bed method, preferably the feed gas inlet temperature is at least about 50° C. lower than the reactor temperature when producing commercial quantities of TCM. Generally the feed gas inlet temperature is less than about 300° C., and preferably less than about 250° C., for three reasons: (i) to avoid deposition of carbon upstream of the reaction zone which can occur at high temperatures; (ii) to avoid local over-heating at the reaction zone entrance; and (iii) to help remove heat of reaction in the vicinity of the reaction zone entrance. The disproportionation reaction is exothermic, and cooling can be required.

C. Representative Applications for TCM

TCM has many important applications. TCM is particularly effective for increasing the viscosity and for gelling a wide range of materials. Liquids whose viscosity can be increased and that can be converted to nonpourable gels at room temperature by addition of small amounts of TCM are presented in Table 1. By the term "gel" there is meant that at room temperature the composition has a viscosity greater than 100,000 cps and cannot be poured. With reference to Table 1, the water with a pH of 3.0 was produced by adding sulfuric acid to the water. The water samples having a pH of 9.5 and 12 were prepared by adding sodium hydroxide to water.

To increase the viscosity of a liquid with TCM it is merely necessary to disperse the TCM in the liquid such as with a Waring blender. Wetting agents generally are not required. When producing mixtures of TCM with aqueous solutions containing high concentrations of electrolytes such as calcium chloride, it is more effective to first add the TCM to the water before dissolving the salt.

Generally at least 0.1% by weight TCM is added to the liquid. Sufficient TCM is added to satisfy one or both of the criteria that (1) the viscosity of the liquid is increased by at least a factor of 10 (2) the viscosity of the liquid is at least 10 cp at a shear rate of 1 $sec^{-1}$.

TABLE 1

Gels Formed With TCM

| Liquid | TCM Content (% by Wt) |
|---|---|
| Distilled Water | 5-8 |
| pH 3.0 Water | 5 |
| pH 9.5 Water | 5 |
| pH 12 Water | 5 |
| Saturated Calcium Chloride Solution | 5 |
| 10% Potassium Chloride Solution | 5 |
| 20% Potassium Chloride Solution | 5 |
| Distilled Kerosene | 10 |
| Mobil Lubrite TM Motor Oil | 9.5 |
| Methanol | 8.7 |
| Mineral Oil | 6 |
| n-hexane | 5 |
| JP-5 Fuel | 7 |
| Base Oil for Commercial Calcium Grease | 8.5 |
| Dow Corning Silicone Oil | 8 |

When percent by weights of TCM in a liquid are presented herein, there is meant the percent by weight of the total composition, i.e. the liquid in combination with the TCM and any other additives present. For example, a mixture of 5 grams of TCM, 15 grams of barite, and 80 ml of water contains 5% by weight TCM.

Table 1 demonstrates that TCM can be used to thicken silicone oils, hydrocarbons, and aqueous solutions, including aqueous solutions having low and high pH's and aqueous solutions containing electrolytes. This is unusual, particularly in that a wetting agent is not needed. Other common viscosifiers such as clays or fumed silicas require special treatments or wetting agents in order to broaden their range of applicability. Also other common viscosifiers are not effective with both acidic and basic solutions. For example, fumed silicas, which depend on hydrogen bonding to establish a long range gelling matrix, are essentially ineffective in high pH solutions as demonstrated by Example 7 below.

When TCM is added to liquids, the resulting mixture is highly shear thinning, i.e. as the shearing rate on the material is increased, for example by stirring or pumping, the effective viscosity decreases (see Example 7). However, unlike many other gelling materials such as fumed silicas and clays, the viscosity at any shear rate does not change with time (see Example 8). Particularly at low shear rates, the viscosity of mixtures of TCM with liquids is generally much more independent of temperature than is the base liquid (see Example 9). A glob of gel made by adding 8% TCM to mineral oil showed no slumping, melting, liquid-solid separation, or visible deformation when heated from 22° to 135° C. Over that temperature range the viscosity of the base mineral oil changed by about a factor of 30. This temperature stability of TCM is in sharp contrast to polymeric viscosifiers which generally start to break down at temperatures of 125° to 150° C. A diesel oil, with only 3% by weight addition of TCM, was very stable in a 72 hour rolling test at 150° C. (see Example 10).

Not only is TCM an effective, temperature stable viscosifier, it is also able to hold in suspension other denser, solid particles that normally settle to the bottom of an unstirred liquid. For example, it was found that in water of pH 9.5, 7.5 pounds per barrel of TCM hold in suspension indefinitely 400 pounds per barrel of very dense, 4.5 g/cm$^3$ barite.

One use of TCM as a viscosifier is to blend it with lubricating oils to produce thermally stable lubricating greases. Such a grease comprises a lubricating oil having dispersed therein sufficient TCM, in an amount of at least 0.1% by weight of the grease, that the grease has an apparent viscosity of at least 4Pa.S at a shear rate of 100 sec$^{-1}$. All viscosities presented herein, unless indicated otherwise, are those measured at room temperature. Surprisingly it was found that the addition of TCM to a base lubricating oil produces a grease with a lower coefficient of friction than the base oil itself in elastohydrodynamic lubrication. "Elastohydrodynamic lubrication" refers to the lubrication of highly loaded machine elements such as gears, cams, and rolling element bearings, where two opposing surfaces are either completely or in part separated by just a lubricant film.

In addition, TCM added to water in a sufficient quantity to gel the water has a lubricating effect (see Example 13 below). Such water based gels containing TCM can make good cutting or machining lubricants and/or lubricants for high temperature forging or extrusion.

A wide variety of lubricating oils, including silicone oils, can be used in greases according to the present invention. Lubricating oils have a viscosity in the range of 25 mm$^2$/S to 650 mm$^2$/S at 40° C. can be used. Generally petroleum oils of about 100 to 130 mm$^2$/S viscosity at 40° C. are used to form the grease. The base oil need not be natural petroleum oil, but can be a synthetic oil such as a diester or a silicone oil.

In addition to TCM, other thickeners or gelling agents can be used, including the fatty-acid soaps of lithium, calcium, sodium, aluminum, and barium. Also finely divided clay particles such as those of the bentonite and hectorite types, after coating with organic materials such as quaternary ammonium compounds, can be used.

The grease can also contain chemical additives to improve oxidation resistance, provide rust protection, and provide the grease with extreme pressure properties. For example 1-naphthyl(phenyl)amine can be added as an oxidation inhibitor.

The grease can contain additives to prevent water and salt-spray corrosion such as amine salts, metal sulfonates, and cycloparaffin salts.

TCM can also be used in a lubricating oil, preferably in an amount of at least 0.1% by weight as a viscosity index improver. The base lubricating oil can be any of those identified above as used for greases, including petroleum oils, synthetic hydrocarbon oils, and silicone oils. The lubricating oil can contain additives in addition to TCM, such as oxidation inhibitors including hindered phenols and amines. The lubricating oil can also contain rust inhibitors such as mildly polar organic acids, including those of the alkyl-succinic type. The lubricating oil can also contain anti-wear agents, detergents, dispersants, pour-point depressants, and viscosity-index improvers in addition to the TCM.

Another important application for TCM is in drilling fluids. In well-drilling operations, the drilling fluid or mud is pumped down a hollow drill string and down through drill bit nozzles in the bottom of the bore hole. From there the mud passes up to the surface through an annulus formed by the bore hole or casing and the drill string to bring formation cuttings to the surface. In drilling the well a drill bit is turned by rotating the drill string or by rotating the drill bit with a down hole motor. The drilling fluid, after it reaches the surface, has formation material removed from it, and is then treated with additives to obtain a set of desired properties. Once treated, the fluid is pumped back into the well and the cycle is repeated.

It is desirable that the drilling fluid be thin at the drilling bit where the shear rate is very high and thicker in the return annulus in order to carry away the formation cuttings. In the annulus area the shear rate is much lower than at the drill bit. Difficulty is experienced in obtaining drilling fluids with these properties when the temperature in the bore hole is very high, in the order of about 400° F., as is experienced with deep bore holes.

TCM is a surprisingly effective additive for drilling fluids. A drilling fluid according to the present invention comprises a liquid having dispersed therein (i) sufficient weighting agent that the drilling fluid has a density of at least 1.1 g/cm$^3$ and often at least 1.5 g/cm, and (ii) sufficient TCM in an amount of at least 0.1% by weight that the drilling fluid has a viscosity of at least 10 cp at room temperature at a shear rate of 1000 sec$^{-1}$. TCM not only provides the drilling fluid with the desired viscosity, it also helps suspend the dense material. Water based drilling muds can be formulated with TCM to have the following viscosities:

(1) in the drill bit area where shear rates can be greater than 10,000 sec$^{-1}$, less than 10 cp; and (2) in the annulus region where shear rates can be from 10 to 500 sec$^{-1}$, less than about 100 cp.

Sufficient TCM is used to suspend the weighting agent. For example, a gel strength of 5 lb/100 ft$^2$ is adequate to suspend barite. TCM in a water based mud, (having a density of 15.5 lb/gal) gives a gel strength greater than 5 lb/100 ft$^2$.

TCM is effective in drilling fluids where the liquid is (1) water, including fresh water, sea water, and salt water; (2) hydrocarbon based such as petroleum based; and (3) water-in-oil emulsions. As shown in Table 1 above, TCM is an effective viscosifier for both oil and water systems, including water systems containing high concentrations of electrolytes. In addition, most water based drilling fluids are alkaline, having a pH of from about 9.5 to about 12 and TCM is effective in alkaline solutions as shown by the data presented in Table 1 above.

The drilling fluid of the present invention contains sufficient weighting agents to provide hydrostatic pressure against exposed formations in excess of the pressure of the formation fluids. In addition, sufficient weighting agent is provided in the drilling fluid so the hydrostatic pressure of the column of drilling fluid prevents collapse of weak formations into the bore hole. The preferred densifying material is barite. Other densifying materials that can be used include galena (PbS), natural and synthetic hematite ($Fe_2O_3$), magnetite ($Fe_3O_4$), ilmenite ($FeTiO_3$), siderite ($FeCO_3$), celesite ($SrSO_4$), dolomite ($CaCO_3.MgCO_3$), and/or calcite ($CaCO_3$).

In addition to TCM, other viscosifiers can be used such as bentonite, attapulgite, and organophilic clays.

Organic polymers can be used to increase viscosity and to control filtration rates, including starch, guar gum, sodium carboxymethyl cellulose, and xanthan gum. In some instances thinning agents such as lignosulfanate can be used.

As noted above water-based drilling fluids are generally maintained at an alkaline pH to function properly and to reduce corrosion. Sodium hydroxide, lime, or magnesium oxide can be used for this purpose.

The drilling fluid can contain surfactants when the base liquid is a water-in-oil emulsion.

Other additives commonly used in conventional drilling fluids can be used in the drilling fluid.

The TCM, weighting agents, and other additives can be provided as a dry mixture, or a mixture dispersed in a liquid at high concentrations, for later dispersion in a liquid at desired concentrations to form a drilling mud.

EXAMPLES

These and other features of the present invention are demonstrated by the following Examples.

EXAMPLE 1

This example demonstrates that in the fixed bed method for producing small quantities of TCM the thickness of the layer of the iron containing particulate affects the bulk density of the product formed.

The catalyst used was iron oxide powder ($Fe_2O_3$) having a number average particle size of 0.5 micron. The iron oxide powder was spread uniformly over the bottom of a horizontal quartz reactor tube having a diameter of 3 inches and a length of 3 feet. The catalyst was spread over only 9 inches of the length of the tube. The reactor tube was placed in a Lindburg furnace having a uniform hot zone about 18 inches long, with all the iron oxide powder in the uniform hot zone. Feed gas consisting of 50% carbon monoxide and 50% hydrogen was introduced into the reactor tube at one end, preheated to reactor temperature, passed over the iron oxide powder, and then passed out the other end of the reactor tube. The gas flow rate was 0.335 standard liters per minute. During the course of the run which lasted 24 hours, the temperature of the iron oxide powder was controlled between about 427° and 441° C.

After 24 hours the resulting fibrous carbon mass was recovered. Three runs were conducted at differing catalyst powder layer thicknesses.

The results of the three runs are presented in Table 2. The results indicate that to obtain a fibrous carbonaceous material having a bulk density of less than about 0.1 g/cm$^3$ it is necessary that the catalyst powder layer thickness be less than about 0.01 gram Fe/cm$^2$.

EXAMPLE 2

This Example demonstrates the effectiveness of the use of a blend of TCM and iron oxide particulate for forming TCM.

In this Example, the same technique used for Example 1 was used, except that 0.782 grams of iron oxide powder were dry blended with 3.128 grams of previously prepared TCM. The resulting mixture contained 20% by weight of the iron oxide powder and about 2% by weight of other iron that was in the previously prepared TCM. This blend was used in the same reactor with the same furnace with the same feed gas, the same gas flow rate, and the same temperatures as used for Example 1.

After 24 hours, the material present in the reactor was recovered. This recovered material weighed 23.9 grams and contained 97.5% by weight carbon. The bulk density of the material was 0.030 g/cm$^3$ and its surface area was 138 m$^2$/g.

TABLE 2

Effect of Iron Oxide Catalyst Powder Layer Thickness On The Resulting Bulk Density of Fibrous Carbon

| Run | Catalyst Powder Layer Thickness (Grams Fe/cm$^3$) | Product Carbon (Weight %) | Product Bulk Density (Grams/cm$^3$) |
|---|---|---|---|
| 1 | 0.0026 | 97.6 | 0.044 |
| 2 | 0.0043 | 98.5 | 0.086 |
| 3 | 0.0124 | 97.8 | 0.11 |

The average carbon deposition rate was 1.54 grams of carbon per hour per gram of iron, and 15.6% of the carbon that was in the inlet gas (as carbon monoxide) was deposited as fibrous carbon.

EXAMPLE 3

The procedure of Example 2 was repeated except that the blend contained 50% by weight of the iron oxide powder and 50% by weight of the previously prepared TCM. The run was for 19.2 hours and the temperature was controlled between 421° and 428° C. The final carbon content of the formed TCM was 96% by weight, its bulk density was 0.027 g/cm$^3$, its surface area was 122 m$^2$/g, and its number average fiber diameter was 0.12 micron.

EXAMPLE 4

The procedure of Example 2 was repeated except that the temperature was between 455° and 470° C. rather than 427° to 441° C. The TCM formed contained 98.3% carbon and had a bulk density of 0.1 g/cm$^3$. The average carbon deposition rate was 2.24 grams of carbon per hour per gram of iron.

This Example demonstrates that at reaction temperatures approaching 500° C., the bulk density of the TCM begins to become higher than desired, i.e. becomes greater than about 0.1 g/cm$^3$. Comparing the results of this Example with the results of Example 2 shows that by increasing the average temperature by about 30° C. a product with over three times higher bulk density is formed.

EXAMPLE 5

This Example shows that restraining the growth of carbon fibers increases the bulk density of the product formed.

In this Example the same procedure used for Example 2 was used except that the blend of TCM and iron oxide powder was loaded into a 1" diameter by 12" long cylindrical quartz boat with closed ends. This boat was then loaded into the 3" horizontal reactor tube described in Example 1. Thus the growing carbon mass was able to expand only in one direction, i.e. up.

The final product contained 97.6% by weight carbon and had a bulk density of 0.072 g/cm$^3$, which was over twice the bulk density of the product formed in Example 2 where the material was free to expand.

EXAMPLE 6

This Example shows the effect of increased catalyst particle size on the bulk density of the TCM formed.

The procedure of Example 2 was repeated except that carbonyl iron powder of mean particle the size of about 5 microns was substituted for the 0.5 micron iron oxide catalyst. The carbonyl iron powder was dry blended with previously formed TCM in an amount sufficient that the blend contained 20% by weight iron. During the run the temperature was maintained in the range of from 432° to 444° C. The final product contained 96.6% by weight carbon and had a bulk density of 0.078 g/cm$^3$ which is about 150% greater than the bulk density of Example 2.

EXAMPLE 7

This Example demonstrates that TCM is effective as a viscosifier in both acidic and basic solutions and is a more effective viscosifier than fumed silica.

Standard aqueous solutions were made by adding sulfuric acid or sodium hydroxide to distilled water to obtain solutions having a pH of 12, 9.5, and 3.0. The pH values were determined with a Corning model 12 research pH meter. To 50 ml samples of each solution, there were added 2.63 grams of TCM made by a fixed bed method using a blend of TCM and an iron containing catalyst. The TCM added to each solution had a bulk density of 0.031 g/cm$^3$, a surface area of 117 m$^2$/g, a fiber length to diameter ratio of greater than 10, and an iron content of 2.7% by weight. The mixtures were blended in a Waring mixer for one minute, sealed in glass bottles, rotated on a paint roller for 16 hours, and then the effective viscosity of the material was measured as a function of shear rate using a Brookfield viscometer. In a Brookfield viscometer the solution to be measured is placed in a narrow annulus between a rotating bob and a stationary cup. The shear force required to maintain the bob at a constant rotational speed (or shear rate) is directly measured and the effective viscosity is calculated from the shear force measurements, the rate of rotation of the bob, and the geometry of the system.

Table 3 shows the effective viscosity as a function of shear rate for the three sample mixtures. For comparison purposes, the viscosity of the same solutions containing 5% by weight grade M-5 Cab-O-Sil$_{TM}$ fumed silica is shown at each of the 3 pH values and at a shear rate of 5 sec$^{-1}$. Within a typical reproducibility of these measurements (±25%), pH clearly had no effect on the viscosifying effect of TCM. Contrarily, with the fumed silica material there is a very strong effect in that at high pH values of 12 the fumed silica provided no thickening at all of the solution at the 5% by weight level.

The water solution without the carbon or silica added had a viscosity of about 1 cp.

The data in Table 3 demonstrate that TCM at a concentration of 5% by weight dramatically thickens water solutions. In acidic solutions it is 10 times more effective than fumed silica, while in basic solutions it is 2 to 3 orders of magnitude more effective than fumed silica. Further with TCM there is a pronounced shear thinning effect in that the effective viscosity at a relatively stagnant shear rate of 0.5 sec$^{-1}$ is approximately 40 times higher than the viscosity at a shear rate of 93 sec$^{-1}$.

TABLE 3

| | Viscosity (cp) of Fibrous Carbon and Cab-O-Sil Fumed Silica in Acid and Basic Solutions | | | | | |
|---|---|---|---|---|---|---|
| Shear Rate (Sec$^{-1}$) | pH 3 Solution 5% Carbon | pH 9.5 Solution 5% Carbon | pH 12 Solution 5% Carbon | pH 3 Solution 5% Cab-O-Sil | pH 9.5 Solution 5% Cab-O-Sil | pH 12 Solution 5% Cab-O-Sil |
| 0.5 | 20,500 | 16,600 | 18,600 | — | — | — |
| 1.0 | 9,875 | 8,275 | 9,000 | — | — | — |
| 5.0 | 2,925 | 1,760 | 2,220 | 200 | 100 | 1 |
| 19 | 600 | 655 | 850 | — | — | — |
| 46 | 502 | 435 | 528 | — | — | — |
| 93 | 422 | 542 | 411 | — | — | — |

EXAMPLE 8

This Example demonstrates that the effect of TCM on the viscosity of mineral oil does not change appreciably with time.

TCM in an amount of 1.55 grams was added to 50 ml of mineral oil which had a viscosity of 150 cp at 22° C. The TCM used was the same as used for Example 7. The mixture was blended on a Waring mixer for one minute. The mixture was loaded into a Brookfield viscometer and its effective viscosity was measured at 100 RPM (93 sec$^{-1}$ shear rate). The viscometer was turned off and the sample was allowed to sit for ten seconds. A viscosity reading was then made at a shear rate of 2.3 sec$^{-1}$ (2.5 RPM). The motor was turned off again, this time for ten minutes, and the 2.5 RPM viscosity measurement repeated. The motor was then turned off for 20 minutes and the 2.5 RPM measurement repeated and then again for 30 minutes with a repeat of the 2.5 RPM measurement. The results are presented in Table 4.

The results presented in Table 4 show that in the time frame of 10 seconds to 30 minutes, the viscosity at low shear rate of mineral oil containing TCM does not appreciably change as the stagnation time between measurements increases.

TABLE 4

| Viscosity of 3% Fibrous Carbon-Mineral Oil Mixture as a Function of Time | | | |
|---|---|---|---|
| Time at Rest (Minutes) | RPM | Shear Rate ($Sec^{-1}$) | Viscosity (cp) |
| | 100 | 93 | 410 |
| 0.166 | 2.5 | 2.3 | 1220 |
| 10 | 2.5 | 2.3 | 1240 |
| 20 | 2.5 | 2.3 | 1300 |
| 30 | 2.5 | 2.3 | 1300 |

EXAMPLE 9

This Example demonstrates the effectiveness of TCM as a viscosifier for light mineral oil.

Figure 4:
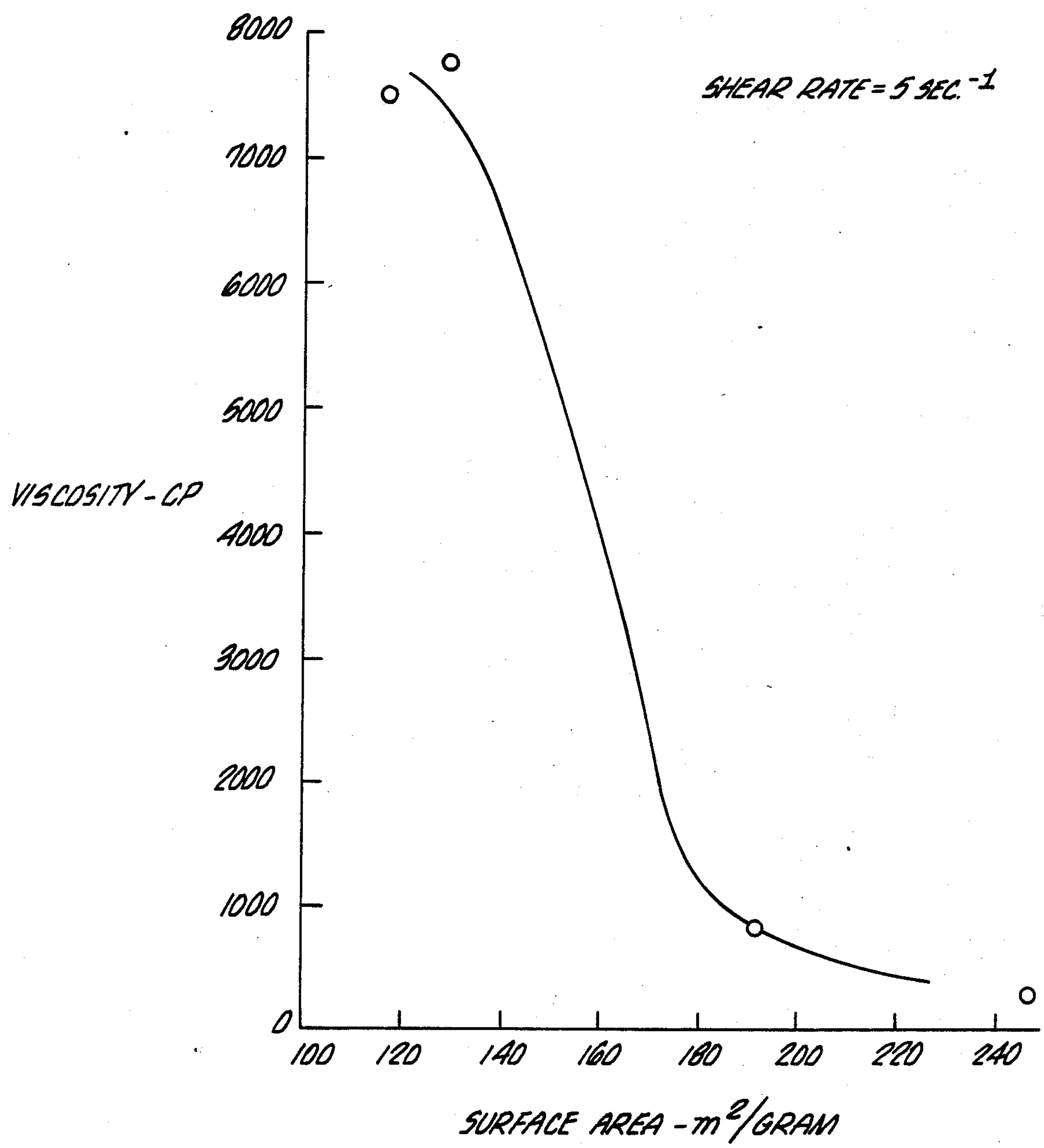
FIG. 4 is a plot of the viscosity of mineral oil containing 5% by weight TCM versus the surface area of the TCM.

TCM having the same properties as the TCM of Example 7 was added to light mineral oil in an amount of 5% by weight. The mixture was blended for one minute in a Waring mixer and then viscosity measurements were made with a Brookfield viscometer as a function of shear rate at temperatures of 22° C., 70° C., and 85° C. The viscosity measurements on the neat mineral oil (i.e. no TCM addition) were also made at 22° C. and 70° C. FIG. 4 presents the results.

The results presented in FIG. 4 show that at low shear rates the viscosity of the TCM-mineral oil mixture is much less dependent on temperature than the base mineral oil itself. At higher shear rates, however, the temperature dependency approaches that of the base mineral oil. FIG. 8 also shows that the viscosity of the mineral oil/TCM blends, like the aqueous blends described in Example 7, are highly shear thinning at all three temperatures investigated. The base mineral oil behaves as a Newtonian fluid and does not show viscosity dependence on shear rate.

EXAMPLE 10

This Example demonstrates the heat stability of TCM as a viscosifier for both oil based and water based muds. It also demonstrates that TCM is effective in suspending dense materials in both oil and water based systems.

To 258 ml of #2 diesel oil were added 400 grams of −325 mesh barite (barium sulfate) and 6.2 grams of TCM. To water there was added either (1) barite in an amount of 400 lb/barrel; (2) TCM in an amount of 1% by weight; (3) barite in an amount of 400 lb/barrel and TCM in an amount of 1% by weight; or (4) barite in an amount of 400 lb/barrel and TCM in an amount of 3% by weight. These mixtures were blended on a Waring mixer for one minute and then the effective viscosity of the mixtures was measured at room temperature as a function of shear rate using a Fann model 29-B viscometer. The Fann viscometer is very similar to the Brookfield viscometer used in the previous Examples except that it is capable of covering a broader shear rate range (5 to 1277 $sec^{-1}$).

After the initial viscosity versus shear rate measurements were made on the samples, the samples were placed in a steel cylinder, which was then sealed. The sealed cylinder was then placed in an oven equipped with a rolling device for rotating the cylinder and the samples within the oven. The samples were initially heated to 300° F. and then rotated in the oven for 72 hours, while holding the sample at 300° F. After this thermal aging, the cylinder and samples were cooled to room temperature, the samples removed from the cylinder, and the viscosity of the samples was again determined as a function of shear rate.

Table 5 compares the initial viscosity versus shear rate data for the aged and unaged oil based samples after 72 hours of 300° F. thermal exposure. FIG. 8 shows viscosity versus shear rate for the aged water based systems. The aged oil based materials had slightly higher viscosity than the initially prepared materials particularly at the lower shear rates. FIG. 8 shows the synergistic effect of barite and TCM in increasing the viscosity of water. It should be noted that changes in effective viscosity of the order of a factor of two or less are considered to be relatively minor.

EXAMPLE 11

This Example demonstrates that it is important for TCM to have a bulk density of less than about 0.1 g/cm³ to be effective as a viscosifier.

Four different sample batches of fibrous carbons, all produced by deposition from a carbon monoxide containing gas, using iron based catalysts, were prepared. The samples all had low final iron contents (ranging from 2.7 to 4.3%) and were prepared in ways which led to four different bulk densities and associated surface areas. Samples A and B were prepared in a fixed bed and Samples C and D were prepared in a fluidized bed. A fifth sample batch, commercial Fast Extrusion Furnace (FEF) carbon black was used for comparison purposes.

TABLE 5

| Fann Viscosity vs. Shear Rate for an "As Prepared" Diesel Oil/TCM/Barite Sample and for the Same Sample After 300° F. Thermal Aging | | | |
|---|---|---|---|
| RPM | Shear Rate ($Sec^{-1}$) | Initial Viscosity (cp) | Viscosity After 72 Hrs at 300° F. (cp) |
| 750 | 1277 | 94 | 112 |
| 600 | 1022 | 111 | 131 |
| 300 | 511 | — | 222 |
| 200 | 341 | 248 | 306 |
| 100 | 170 | 420 | 555 |
| 80 | 136 | 510 | 671 |
| 40 | 68 | 952 | 1170 |
| 15 | 26 | 1900 | 2600 |
| 3 | 5 | 3400 | 6000 |

Mixtures of each carbon batch with pH 9.5 water were prepared at the 3%, 5%, and 7% carbon level. Each sample was blended on a Waring mixer for one minute, sealed in glass jars, and rotated on paint mixer rollers for 16 hours. Sample viscosity was then measured as a function of shear rate with a Brookfield viscometer.

An identical matrix of sample mixtures was also prepared using mineral oil as the base liquid in place of pH 9.5 water. The samples were prepared in the same way as the aqueous mixtures and viscosity versus shear rate measurements were made with the Brookfield viscometer.

Tables 6 and 7 present the viscosity of mineral oil and water respectively, for the four fibrous carbons and FEF carbon black, at a shear rate of 25 $sec^{-1}$. It is apparent from Tables 5 and 6 that the low bulk density fibrous carbons (samples A and B, 0.031 and 0.050 bulk density, respectively) were more effective in increasing viscosity then either of the higher density fibrous carbons (samples C and D) or the FEF carbon black. The effects are most pronounced at the higher carbon levels and at lower shear rates. FIG. 6 shows plots of viscosity of the mixture versus carbon content. FIG. 7 shows plots of viscosity versus material surface area at a shear rate of 5 $sec^{-1}$ for the 5% carbon in mineral oil samples.

These Figures show that the highest surface area (high bulk density) sample D is a factor of 26 times less effective as a viscosifier than the low surface area, low bulk density samples A and B. FIG. 6 shows that the viscosity increases more rapidly with increasing carbon content in mineral oil for the low surface area materials than for the high surface area materials or the FEF carbon black.

TABLE 6

| Effective Viscosity At a Shear Rate of 25 $Sec^{-1}$ (Mineral Oil) | | | | | |
|---|---|---|---|---|---|
| Sample | Surface Area (Sq Meters/Gr) | Bulk Density ($Grams/cm^3$) | 3% Carbon | Viscosity (cp) 5% Carbon | 7% Carbon |
| A | 117 | 0.031 | 485 | 2662 | >10000 |
| B | 129 | 0.050 | 738 | 2685 | >10000 |
| C | 192 | 0.15 | 283 | 325 | 604 |
| D | 247 | 0.25 | 210 | 254 | 301 |
| FEF Carbon Black | — | 0.25 | 236 | 319 | 416 |

TABLE 7

| Effective Viscosity At a Shear Rate of 25 $Sec^{-1}$ (pH 9.5 Water) | | | | | |
|---|---|---|---|---|---|
| Sample | Surface Area (Sq Meters/Gr) | Bulk Density ($Grams/cm^3$) | 3% Carbon | Viscosity (cp) 5% Carbon | 7% Carbon |
| A | 117 | 0.031 | 111 | 581 | 2093 |
| B | 129 | 0.050 | 202 | 747 | 2705 |
| C | 192 | 0.15 | 14 | 49 | 79 |
| D | 247 | 0.25 | 2 | 10 | — |
| FEF Carbon Black | — | 0.25 | 3 | 8 | 30 |

FIG. 7 shows that the shear thinning effect of 5% carbon in mineral oil is much more pronounced for the low bulk density carbons than for the high bulk density carbon. That is to say, the effective viscosity decreases more rapidly with increasing shear rate for TCM than for higher bulk density carbons. It is because of this property that the ultra low bulk density material of the present invention is an effective additive for greases.

EXAMPLE 12

This Example demonstrates the importance of maintaining the iron content of TCM at less than about 5% by weight.

A sample of fibrous carbon material was prepared by deposition from a carbon monoxide containing gas stream over an iron catalyst in a fixed bed. The final iron content of the material was 10.2% by weight, its bulk density was 0.050 grams/ml, and its surface area was 122 $m^2/g$. A second sample of fibrous material was also prepared with an iron content of 2.6% by weight, a bulk density of 0.050 $g/cm^3$, and a surface area of 129 $m^2/g$ in a fixed bed.

Each sample of fibrous carbon was mixed with mineral oil and blended for one minute in a Waring mixer. The mineral oil/carbon mixtures contained 3% by weight of fibrous carbon. Viscosity versus shear rate measurements were made with each of the mixtures at room temperature using the Brookfield viscometer.

Table 8 compares the viscosity versus shear rate results for the two carbon/mineral oil mixtures. The only significant difference between the samples is the iron content of the carbons (and by inference their associated fiber lengths). It is apparent that the carbon sample with low iron content (longer fiber length) was significantly more effective in thickening mineral oil than was the higher iron content material. This effect was most pronounced at low shear rates and the differences between the two materials diminished as the shear rate increased.

EXAMPLE 13

Three materials were tested for their effectiveness as a grease. The first material was a base oil, the second material was grease consisting of the base oil and 8.5% by weight TCM, and the third material was water containing 8.5% by weight TCM. The effectiveness of these materials as a grease was tested in an apparatus in which a crown roller was contacted against a flat disk at high pressure. The coefficient of friction of the materials for various velocities of the crown roller at pressures of 0.76 GPa and 1.0 GPa are presented in Table 9. The results presented in Table 9 indicate that under all of the conditions the coefficient of friction of the TCM-oil grease was lower than the coefficient of friction of the oil by itself.

TABLE 8

| Viscosity vs. Shear Rate Measurements for Two Carbon/Mineral Oil Samples Where the Carbons Contain 2.6% Iron and 10.2% Iron Respectively | | | |
|---|---|---|---|
| RPM | Shear Rate ($Sec^{-1}$) | 3% Carbon .050 Bulk Density 129 $m^2/g$ 2.6 Wt % Iron | 3% Carbon .050 Bulk Density 122 $m^2/g$ 10.2 Wt % Iron |
| 0.5 | 0.5 | 8000 | 1100 |
| 1.0 | 0.9 | 4600 | 750 |
| 2.5 | 2.3 | 2420 | 480 |
| 5.0 | 4.7 | 1570 | 400 |
| 10.0 | 9.3 | 1090 | 370 |
| 20.0 | 18.6 | 812 | 325 |
| 50.0 | 46.5 | 590 | 244 |
| 100.0 | 93.0 | 491 | 282 |

TABLE 9

| Comparison of Coefficient of Friction of Commercial Base Oil and Low Density Carbon Grease Made With the Base Oil and With Water | | | |
|---|---|---|---|
| Material | Velocity (m/sec) | Coefficient of Friction at a Pressure of 0.76 (GPa) | Coefficient of Friction at a Pressure of 1.0 (GPa) |
| Base Oil | 0.6 | .047 | .054 |
| | 1.2 | .043 | .051 |
| | 1.8 | .035 | .049 |
| TCM + Base Oil (Grease) | 0.6 | .033 | .045 |
| | 1.2 | .022 | .037 |
| | 1.8 | .016 | .032 |
| Water + TCM | 0.6 | .058 | .035 |
| | 1.2 | .050 | .040 |
| | 1.8 | .064 | .045 |

The results obtained with the water based TCM gel were also excellent. The TCM-water grease had a lower coefficient of friction than pure water by more than an order of magnitude.

EXAMPLE 14

This test demonstrates that a drilling fluid according to the present invention containing TCM and barite is particularly effective.

To #2 diesel oil there were added (1) varying quantities of TCM; (2) 400 pounds per barrel of barite; or (3) both TCM and barite. The viscosity of the mixtures was measured and the results are presented in Table 10 and FIG. 9. The viscosity of a mixture of barite and TCM in the #2 diesel oil was much higher than the sum of the viscosity increases produced by barite alone or by the TCM alone. The addition of 400 pounds per barrel of barite or 2.8 pounds of TCM per barrel to #2 diesel oil resulted in a relatively low viscosity fluid. However, when both materials were added to #2 diesel oil, the viscosity of the resulting fluid was more than 3 times greater than the sum of the viscosity of the fluids with the individual additives.

TABLE 10

Effect on Viscosity of #2 Diesel Oil of Adding Barite Alone, Carbon Alone, and Barite and Carbon Together

| | Effective Viscosity - CP | | |
|---|---|---|---|
| Shear Rate $Sec^{-1}$ | 400 Lbs/Barrel of Barite in #2 Diesel Oil | 2.8 lbs/barrel of TCM in #2 Diesel Oil | 400 Lbs/Barrel Barite Plus 2.1 lbs/barrel TCM in #2 Diesel Oil |
| 1277 | 16 | 7 | 80 |
| 1022 | 16 | 8 | 95 |
| 511 | 16 | 6 | 147 |
| 341 | 18 | 6 | 197 |
| 170 | 24 | 9 | 345 |
| 136 | 26 | 8 | 423 |
| 68 | 38 | 15 | 787 |
| 26 | 80 | — | 1380 |
| 10 | 200 | — | 1900 |
| 5 | 300 | — | 2800 |

EXAMPLE 15

This example demonstrates a fluid bed technique for making low density TCM suitable for use as a viscosifier.

A mixture of 400 grams of previously produced TCM and 72 grams of iron oxide powder ($Fe_2O_3$) having a number average particle size of 0.5 micron was fed to a 16 cm diameter fluid bed reactor. The reactor was operated at an average temperature of about 465° C., and a superficial gas velocity of 8.4 cm/s. The feed gas contained 53% carbon monoxide by volume. The production run lasted 23 hours and 50 minutes. The total output from the run was 1723 g of product with an average iron content of 4.8%, an average bulk density of 0.030 g/cm$^3$, and an average surface area of 114 m$^2$/g. The product material was found to have good viscosifier properties.

EXAMPLE 16

This example demonstrates a fluid bed technique which failed to produce low density TCM suitable for use as a viscosifier.

The solids feed and operating conditions were nearly identical to those in Example 15, with the exception that the average reactor temperature was about 505° C. The production run lasted 13 hours, 30 minutes. The total output from the run was 3290 g of product with an average iron content of about 2%. The product material had a lighter fraction of about 640 g with a bulk density of about 0.056 g/cm$^3$, and a more dense fraction of about 2650 g with a bulk density of about 0.525 g/cm$^3$. Samples from each fraction were found to have poor viscosifier properties, especially the higher density sample.

D. Advantages

As demonstrated in detail above, the composition of matter of the present invention has many advantages over prior art viscosifiers, gelling agents, and suspending agents. It is an effective viscosifier and gelling agent for a wide variety of materials. TCM can be used with hydrocarbon, silicone, and aqueous based liquids. It can be used with aqueous liquids containing high levels of electrolytes. It can be used with low pH and high pH aqueous solutions. It has high temperature stability and high shear thinning properties. There is a synergistic effect between TCM and barite in drilling muds. The addition of TCM to a base lubricating oil produces a grease with a very low coefficient of friction. This property is also evidenced when TCM is added to water in sufficient quantities to form a gel.

This unique combination of properties of TCM renders it effective for many applications, including applications in lubricating oils, greases, and drilling fluids.

Although the present invention has been described in considerable detail with reference to certain preferred versions thereof, other versions are possible. Therefore the spirit and scope of the appended claims should not be limited to the description of the preferred versions contained herein.

What is claimed is:

1. A composition of matter comprising a liquid having dispersed therein tendrillar carbonaceous material in an amount of at least 1% by weight based on the weight of the liquid and the tendrillar carbonaceous material, the tendrillar carbonaceous material having a bulk density of from about 0.02 to about 0.05 g/cm$^3$ and a surface area of from about 30 to about 160 m$^2$/g, the tendrillar carbonaceous material comprising intertwined tendrils having a diameter (number average) of from about 0.08 to about 0.14 micron and a length (number average) to diameter (number average) ratio greater than about 10, the tendrils comprising carbon fibers and an iron metal component dispersed throughout the carbon fibers as nodules that are intimately associated with and at least partially bonded to the carbon fibers, the tendrillar carbonaceous material comprising from about 0.1 to about 5% by weight iron, about 93.5 to about 99.9% by weight carbon, and up to about 1.5% by weight hydrogen, the composition of matter comprising sufficient tendrillar carbonaceous material that the viscosity of the composition of matter at a shear rate of 1 sec$^{-1}$ is at least 10 cp and is at least a factor of 10 greater than the viscosity of the composition of matter without the tendrillar carbonaceous material at a shear rate of 1 sec$^{-1}$.

2. A composition of matter suitable for increasing the viscosity of liquids, the composition of matter comprising tendrillar carbonaceous material having a bulk density of less than about 0.1 g/cm$^3$ and comprising intertwined tendrils having a diameter (number average) of from about 0.05 to about 0.2 micron and a length (number average) to diameter (number average) ratio greater than about 10.

3. The composition of matter of claim 2 wherein the tendrillar carbonaceous material has a surface area of less than about 190 m$^2$/g.

4. The composition of matter of claim 2 in which the tendrillar carbonaceous material has a surface area of from about 30 to about 160 m$^2$/g.

5. The composition of matter of claim 2 in which the tendrillar carbonaceous material has a bulk density of at least about 0.02 g/cm$^3$.

6. The composition of matter of claim 5 in which the tendrillar carbonaceous material has a bulk density of less than about 0.05 g./cm$^3$.

7. The composition of matter of claim 2 in which the tendrils have a diameter (number average) of from about 0.08 to about 0.14 micron.

8. The composition of matter of claim 2 in which the tendrils comprise carbon fibers and an iron metal component dispersed throughout the carbon fibers as nodules that are intimately associated with and at least partially bonded to the carbon fibers.

9. The composition of matter of claim 8 in which the tendrillar carbonaceous material comprises up to about 5% by weight iron.

10. The composition of matter of claim 9 in which the tendrillar carbonaceous material comprises at least about 0.1% by weight iron.

11. The composition of matter of claim 10 in which the tendrillar carbonaceous material comprises from about 0.1 to about 5% by weight iron, about 93.5 to about 99.9% by weight carbon, and up to about 1.5% by weight hydrogen.

12. A composition of matter suitable for increasing the viscosity of liquids, the composition of matter comprising tendrillar carbonaceous material having a bulk density of from about 0.02 to about 0.05 g/cm$^3$ and a surface area of from about 30 to about 160 m$^2$/g, the tendrillar carbonaceous material comprising intertwined tendrils having a diameter (number average) of from about 0.08 to about 0.14 micron and a length (number average) to diameter (number average) ratio greater than about 10, the tendrils comprising carbon fibers and an iron metal component dispersed throughout the carbon fibers as nodules that are intimately associated with and at least partially bonded to the carbon fibers, the tendrillar carbonaceous material comprising from about 0.1 to about 5% by weight iron, about 93.5 to about 99.9% by weight carbon, and up to about 1.5% by weight hydrogen.

13. A composition of matter comprising a liquid having dispersed therein tendrillar carbonaceous material in an amount of at least 0.1% by weight based on the weight of the liquid and the tendrillar carbonaceous material, the tendrillar carbonaceous material having a bulk density less than about 0.1 g/cm$^3$ and comprising intertwined tendrils having a diameter (number average) of from about 0.05 to about 0.2 micron and a length (number average) to diameter (number average) ratio greater than about 10, the composition of matter comprising sufficient tendrillar carbonaceous material that the liquid has a viscosity at a shear rate of 1 sec$^{-1}$ of at least 10 cp and at least a factor of 10 greater than the viscosity of the composition of matter without the tendrillar carbonaceous material at a shear rate of 1 sec$^{-1}$.

14. The composition of matter of claim 13 in which the liquid comprises water.

15. The composition of matter of claim 14 having a pH of less than 4.

16. The composition of claim 14 having a pH of greater than 9.

17. The composition of matter of claim 13 in which the liquid comprises a hydrocarbon.

18. The composition of matter of claim 17 in which the liquid is mineral oil.

19. The composition of matter of claim 17 in which the liquid is a lubricating oil.

20. The composition of matter of claim 13 in which the liquid comprises silicone oil.

21. The composition of matter of claim 13 containing less than the amount of tendrillar carbonaceous material that causes the liquid to gel.

22. The composition of matter of claim 13 wherein the tendrillar carbonaceous material has a surface area is less than about 190 m$^2$/g.

23. The composition of matter of claim 22 in which the tendrillar carbonaceous material has a surface area of from about 30 to about 160 m$^2$/g.

24. The composition of matter of claim 13 in which the tendrillar carbonaceous material has a bulk density of at least about 0.02 g/cm$^3$.

25. The composition of matter of claim 24 in which the tendrillar carbonaceous material has a bulk density of less than about 0.05 g/cm$^3$.

26. The composition of matter of claim 13 in which the tendrils have a diameter (number average) of from about 0.08 to about 0.14 micron.

27. The composition of matter of claim 13 in which the tendrils comprise carbon fibers and an iron metal component dispersed throughout the carbon fibers as nodules that are intimately associated with and at least partially bonded to the carbon fibers.

28. The composition of matter of claim 27 in which the tendrillar carbonaceous material comprises up to about 5% by weight iron.

29. The composition of matter of claim 28 in which the tendrillar carbonaceous material comprises at least about 0.1% by weight iron.

30. The composition of matter of claim 29 in which the tendrillar carbonaceous material comprises from about 0.1 to about 5% by weight iron, about 93.5 to about 99.9% by weight carbon, and up to about 1.5% by weight hydrogen.

31. A composition of matter comprising a liquid having dispersed therein (i) a dense material having a density greater than the density of the liquid, and (ii) tendrillar carbonaceous material in an amount of at least 0.1% by weight based on the weight of the composition of matter, the tendrillar carbonaceous material having a bulk density of less than about 0.1 g/cm$^3$ and comprising intertwined tendrils having a diameter (number average) of from about 0.05 to about 0.2 micron and a length (number average) to diameter (number average) ratio greater than about 10, the composition of matter comprising sufficient tendrillar carbonaceous that the dense material is suspended in the liquid.

32. The composition of matter of claim 31 in which the liquid comprises water.

33. The composition of matter of claim 31 in which the liquid comprises a hydrocarbon.

34. The composition of matter of claim 31 in which the liquid comprises silicone oil.

35. The composition of matter of claim 31 containing less than the amount of tendrillar carbonaceous material that causes the liquid to gel.

36. The composition of matter of claim 31 wherein the tendrillar carbonaceous material has a surface area of less than about 190 m$^2$/g.

37. The composition of matter of claim 36 in which tendrillar carbonaceous material has a surface area of from about 30 to about 160 m$^2$/g.

38. The composition of matter of claim 31 in which the tendrillar carbonaceous material has a bulk density of at least about 0.02 g/cm$^3$.

39. The composition of matter of claim 31 in which the tendrillar carbonaceous material has a bulk density of less than about 0.05 g/cm$^3$.

40. The composition of matter of claim 31 in which the tendrils comprise carbon fibers and an iron metal component dispersed throughout the carbon fibers as nodules that are intimately associated with and at least partially bonded to the carbon fibers.

41. The composition of matter of claim 40 in which the tendrillar carbonaceous material comprises from about 0.1 to about 5% by weight iron, about 93.5 to about 99.9% by weight carbon, and up to about 1.5% by weight hydrogen.

42. A drilling fluid comprising a liquid having dispersed therein (i) sufficient weighting agent that the drilling fluid has a density of at least 1.1 g/cm$^3$ and (ii) sufficient tendrillar carbonaceous material in an amount of at least 0.1% by weight based on the weight of the drilling fluid that the drilling fluid has a viscosity of at least 10 cp at a shear rate of 1000 sec$^{-1}$.

43. The drilling fluid of claim 42 wherein the tendrillar carbonaceous material has a bulk density of less than about 0.1 g/cm$^3$.

44. The drilling fluid of claim 43 wherein the tendrillar carbonaceous material comprising intertwined tendrils having a diameter (number average) of from about 0.05 to about 0.2 micron and a length (number average) to diameter (number average) ratio greater than about 10.

45. The drilling fluid of claim 42 in wherein the tendrillar carbonaceous material has a surface area of less than about 190 m$^2$/g.

46. The drilling fluid of claim 45 in which the tendrillar carbonaceous material has a surface area of from about 30 to about 160 m$^2$/g.

47. The drilling fluid of claim 44 in which the tendrils comprise carbon fibers and an iron metal component dispersed throughout the carbon fibers as nodules that are intimately associated with and at least partially bonded to the carbon fibers.

48. The drilling fluid of claim 47 in which the tendrillar carbonaceous material comprises from about 0.1 to about 5% by weight iron, about 93.5 to about 99.9% by weight carbon, and up to about 1.5% by weight hydrogen.

49. The drilling fluid of claim 44 in which the liquid comprises water.

50. The drilling fluid of claim 44 in which the liquid comprises a hydrocarbon.

51. The drilling fluid of claim 44 in which the tendrillar carbonaceous material suspends the weighting agent in the liquid.

52. The drilling fluid of claim 44 in which the weighting agent is barium sulfate.

53. The drilling fluid of claim 44 comprising a viscosity increasing agent in addition to the tendrillar carbonaceous material.

54. The drilling fluid of claim 53 in which the viscosity increasing agent comprises clay.

55. The drilling fluid of claim 44 comprising a viscosity thinning agent.

56. The drilling fluid of claim 44 comprising an alkalinity control agent to maintain the pH of the drilling fluid greater than 7.0.

57. The drilling fluid of claim 44 comprising a surfactant.

58. The drilling fluid of claim 44 comprising a flocculent.

59. A drilling fluid comprising a liquid having dispersed therein (i) sufficient weighting agent that the drilling fluid has a density of at least 1.1 g/cm$^3$ and (ii) sufficient tendrillar carbonaceous material in an amount of at least 0.1% by weight based on the weight of the drilling fluid that the drilling fluid has a viscosity of at least 10 cp at a shear rate of 1000 sec$^{-1}$, the tendrillar carbonaceous material having a bulk density of less than about 0.1 g/cm$^3$ and a surface area less than about 190 m$^2$/g, the tendrillar carbonaceous material comprising intertwined tendrils having a diameter (number average) of from about 0.05 to about 0.2 micron and a length (number average) to diameter (number average) ratio greater than about 10.

60. The drilling fluid of claim 59 in which the tendrils comprise carbon fibers and an iron metal component dispersed throughout the carbon fibers as nodules that are intimately associated with and at least partially bonded to the carbon fibers, the tendrillar carbonaceous material comprising from about 0.1 to about 5% by weight iron, about 93.5 to about 99.9% by weight carbon, and up to about 1.5% by weight hydrogen.

61. A grease comprising a lubricating oil having dispersed therein sufficient tendrillar carbonaceous material, in an amount of at least 0.1% by weight of the grease that the grease has an apparent viscosity of at least 4 Pa.S at a shear rate of 100 sec$^{-1}$, the tendrillar carbonaceous material having a bulk density less than about 0.1 g/cm$^3$ and comprising intertwined tendrils having a diameter (number average) of from about 0.05 to about 0.2 micron and a length (number average) to diameter (number average) ratio greater than about 10.

62. The grease of claim 61 in which the tendrillar carbonaceous material has a surface area of less than about 190 m$^2$/g.

63. The grease of claim 62 in which the tendrillar carbonaceous material has a surface area of from about 30 to about 160 m$^2$/g.

64. The grease of claim 61 wherein the tendrillar carbonaceous material has a bulk density of less than about 0.05 g/cm$^3$.

65. The grease of claim 61 in which the tendrils comprise carbon fibers and an iron metal component dispersed throughout the carbon fibers as nodules that are intimately associated with and at least partially bonded to the carbon fibers.

66. The grease of claim 65 in which the tendrillar carbonaceous material comprises from about 0.1 to about 5% by weight iron, about 93.5% to about 99.9% by weight carbon, and up to about 1.5% by weight hydrogen.

67. The grease of claim 61 comprising from about 5 to about 15% by weight tendrillar carbonaceous material.

68. The grease of claim 61 comprising a gelling agent.

69. The grease of claim 68 in which the gelling agent is selected from the group consisting of fatty-acid soaps of lithium, calcium, sodium, aluminum, and barium.

70. A method for increasing the viscosity of a liquid comprising the step of dispersing in the liquid tendrillar carbonaceous material in an amount of at least 0.1% by weight based on the weight of the liquid and the tendrillar carbonaceous material, the tendrillar carbonaceous material having a bulk density of less than about 0.1 g/cm$^3$ and comprising intertwined tendrils having a diameter (number average) of from about 0.05 to about 0.2 micron and a length (number average) to diameter (number average) ratio greater than about 10, sufficient tendrillar carbonaceous material being dispersed in the liquid that the liquid has a viscosity at a shear rate of 1 sec$^{-1}$ of at least 10 cp and at least a factor of 10 greater than the viscosity of the liquid without the tendrillar carbonaceous material at a shear rate of 1 sec$^{-1}$.

71. The method of claim 70 wherein the tendrillar carbonaceous material has a surface area of less than about 190 $m^2/g$.

72. The method of claim 71 in which the tendrillar carbonaceous material has a surface area of from about 30 to about 160 $m^2/g$.

73. The method of claim 71 in which the tendrillar carbonaceous material has a bulk density of less than about 0.05 $g/cm^3$.

74. The method of claim 71 in which the tendrils comprise carbon fibers and an iron metal component dispersed throughout the carbon fibers as nodules that are intimately associated with and at least partially bonded to the carbon fibers.

75. The method of claim 74 in which the tendrillar carbonaceous material comprises from about 0.1 to about 5% by weight iron, about 93.5 to about 99.9% by weight carbon, and up to about 1.5% by weight hydrogen.

76. The method of claim 71 in which the liquid is water.

77. The method of claim 76 in which the liquid is a drilling fluid.

78. The method of claim 77 in which the step of dispersing comprises dispersing sufficient tendrillar carbonaceous material in the liquid that the liquid has a viscosity of at least 10 cp at a shear rate of 1,000 $sec^{-1}$.

79. The method of claim 71 in which the liquid comprises a hydrocarbon.

80. The method of claim 79 in which the liquid is a drilling fluid.

81. The method of claim 80 in which the step of dispersing comprises dispersing sufficient tendrillar carbonaceous in the liquid that the liquid has a viscosity of at least 10 cp at a shear rate of 1000 $sec^{-1}$.

82. The method of claim 79 in which the liquid is a lubricating oil and the step of dispersing comprises dispersing sufficient tendrillar carbonaceous material in the lubricating oil that it has an apparent viscosity of at least 4 Pa.S at a shear rate of 100 $sec^{-1}$.

83. The method of claim 71 in which the liquid is a silicone oil and the step of dispersing sufficient tendrillar carbonaceous material in the silicone oil that the silicone oil has an apparent viscosity of at least 4 Pa S at a shear rate of 100 $S^{-1}$.

* * * * *